(12) United States Patent
Hsueh et al.

(10) Patent No.: US 8,045,351 B2
(45) Date of Patent: Oct. 25, 2011

(54) METHOD AND APPARATUS OF PROVIDING A BIASED CURRENT LIMIT FOR LIMITING MAXIMUM OUTPUT POWER OF POWER CONVERTERS

(75) Inventors: Cheng-Chi Hsueh, Taipei County (TW); Wei-Hsuan Huang, Taoyuan County (TW); Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 489 days.

(21) Appl. No.: 12/337,608

(22) Filed: Dec. 17, 2008

(65) Prior Publication Data

US 2010/0007394 A1   Jan. 14, 2010

Related U.S. Application Data

(60) Provisional application No. 61/134,515, filed on Jul. 9, 2008.

(51) Int. Cl.
*H02M 3/24* (2006.01)

(52) U.S. Cl. ......................................... 363/95

(58) Field of Classification Search ............... 363/21.01, 363/21.12, 21.16, 21.18, 95, 97; 323/299–303
See application file for complete search history.

(56) References Cited

U.S. PATENT DOCUMENTS

| | | | |
|---|---|---|---|
| 6,611,439 B1 | 8/2003 | Yang et al. | |
| 6,674,656 B1 | 1/2004 | Yang et al. | |
| 6,977,824 B1 * | 12/2005 | Yang et al. | 363/21.16 |
| 7,710,095 B2 * | 5/2010 | Huang et al. | 323/288 |
| 7,746,050 B2 * | 6/2010 | Djenguerian et al. | 323/299 |
| 2008/0310192 A1 * | 12/2008 | Huang et al. | 363/21.17 |

* cited by examiner

*Primary Examiner* — Adolf Berhane
*Assistant Examiner* — Yemane Mehari
(74) *Attorney, Agent, or Firm* — Jianq Chyun IP Office

(57) ABSTRACT

A biased current-limit circuit for limiting a maximum output power of a power converter includes an oscillator for generating a pulse signal. A waveform generator generates a waveform signal in response to a switching signal and a second-sampling signal. A sample-hold circuit is used to sample the waveform signal to generate a hold signal in response to a first-sampling signal. The sample-hold circuit further samples the hold signal to generate a current-limit threshold in response to the second-sampling signal. A current comparator is utilized to compare a current-sensing signal with the current-limit threshold to limit a maximum on-time of the switching signal.

12 Claims, 4 Drawing Sheets

METHOD AND APPARATUS OF PROVIDING A BIASED CURRENT LIMIT FOR LIMITING MAXIMUM OUTPUT POWER OF POWER CONVERTERS

CROSS-REFERENCE TO RELATED APPLICATION

This application claims the priority benefit of U.S. provisional application Ser. No. 61/134,515, filed Jul. 9, 2008. The entirety of the above-mentioned patent application is hereby incorporated by reference herein and made a part of this specification.

BACKGROUND OF THE INVENTION

1. Field of the Invention

The present invention relates to power converters, and more particularly, to a control circuit providing a biased current limit used for limiting a maximum output power of power converters.

2. Background of the Invention

In recent development, many current limit schemes are proposed for limiting the output power of power converters, such as "PWM controller for controlling output power limit of a power supply" by Yang, et al, U.S. Pat. No. 6,611,439; "PWM controller having a saw-limiter for output power limit without sensing input voltage" by Yang, et al, U.S. Pat. No. 6,674,656. However, the patent '439 requires an input resistor connected to the input voltage, which causes a power loss at the input resistor. A saw-limiter of the patent '656 causes a sub-harmonic oscillation when a switching current is limited and the flux density of a transformer is high. In order to provide the solution, the present invention is directed to a method and an apparatus to limit the maximum output power of power converters without foregoing drawbacks.

SUMMARY OF THE INVENTION

The present invention provides a biased current-limit circuit for limiting a maximum output power of a power converter. The biased current-limit circuit includes an oscillator for generating a pulse signal. A waveform generator generates a waveform signal in response to a switching signal and a second-sampling signal. A sample-hold circuit is used to sample the waveform signal to generate a hold signal in response to a first-sampling signal. The sample-hold circuit further samples the hold signal to generate a current-limit threshold in response to the second-sampling signal. A current comparator is utilized to compare the current-sensing signal with the current-limit threshold to limit a maximum on-time of the switching signal.

DETAILED DESCRIPTION OF EMBODIMENTS

Figure 1:
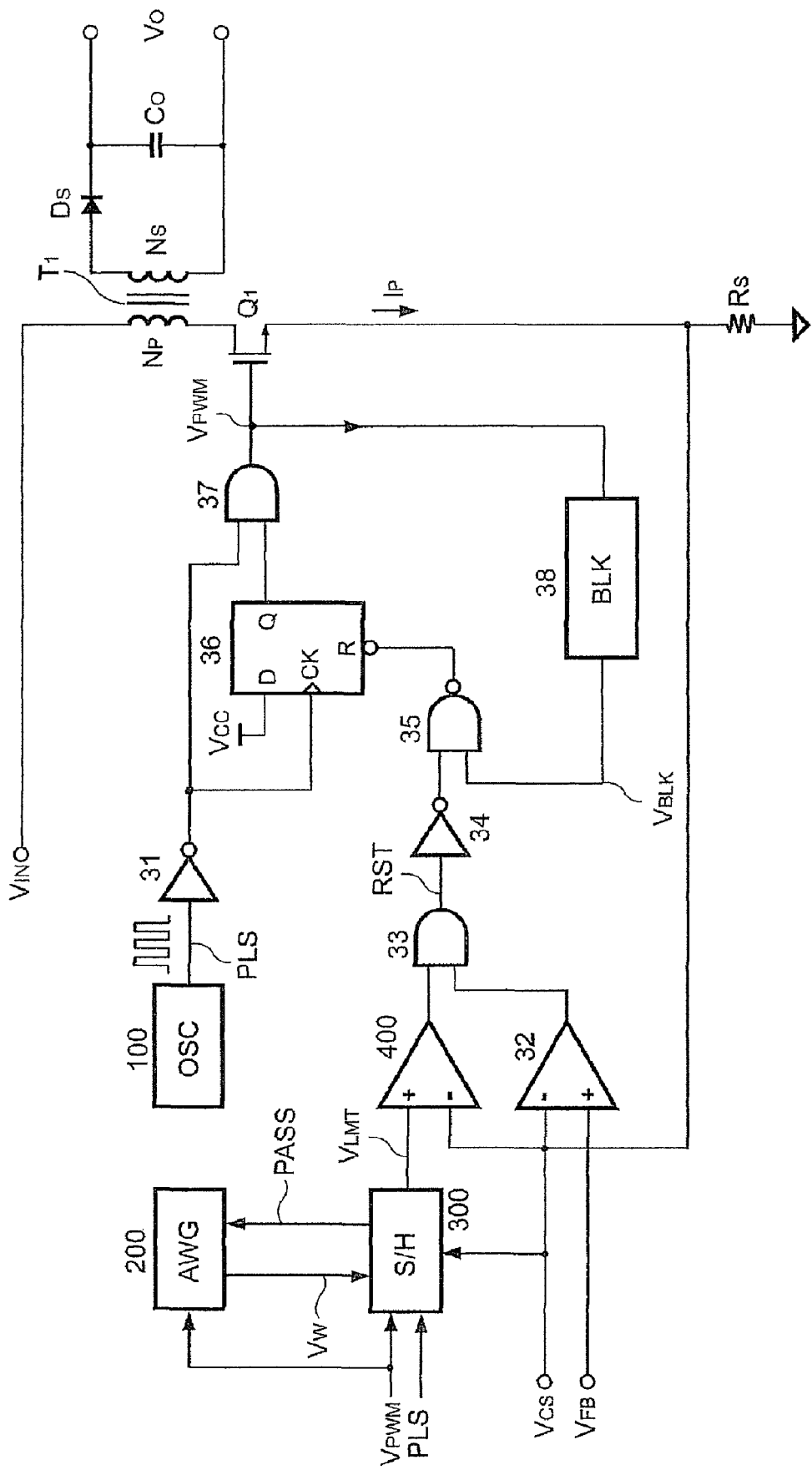
FIG. 1 is a schematic view illustrating one embodiment of a power converter including a biased current-limit circuit according to the present invention.

FIG. 1 is a schematic view illustrating one embodiment of a power converter including a biased current-limit circuit according to the present invention. The power converter includes a switching circuit and a biased current-limit circuit. The switching circuit generates a switching signal $V_{PWM}$ for switching a transformer $T_1$ via a power transistor $Q_1$. The transformer $T_1$ receives an input voltage $V_{IN}$ and generates an output voltage $V_O$ having a primary side $N_P$ and a secondary side $N_S$. The duty cycle of the switching signal $V_{PWM}$ determines the power supplied by an alternating current (AC) power source to an output of the power supply. The switching circuit comprises a first inverter 31, a comparator 32, a first AND gate 33, a second inverter 34, a NAND gate 35, a D flip-flop 36, a second AND gate 37, and a blanking circuit 38. An input D of the D flip-flop 36 is pulled high by a supply voltage $V_{CC}$. A clock input CK of the D flip-flop 36 and a first input of the second AND gate 37 are supplied with a pulse signal PLS through the first inverter 31. A second input of the second AND gate 37 is coupled to an output Q of the D flip-flop 36. The power transistor $Q_1$ is controlled by an output of the second AND gate 37 to determine a switching frequency of the power converter.

A switching current $I_P$ of the transformer $T_1$ is converted to a current-sensing signal $V_{CS}$ (in a voltage form) through a current-sensing resistor $R_S$. The current-sensing signal $V_{CS}$ is provided to the switching circuit for pulse width modulation of the switching signal $V_{PWM}$. A negative input of the comparator 32 is supplied with the current-sensing signal $V_{CS}$. A positive input of the comparator 32 receives a voltage-feedback signal $V_{FB}$. The voltage-feedback signal $V_{FB}$ is correlated to the output voltage $V_O$. Two inputs of the first AND gate 33 are respectively connected to an output of the comparator 32 and the biased current-limit circuit. A first input of the NAND gate 35 is coupled to an output of the first AND gate 33 for receiving a reset signal RST via the second inverter 34. The blanking circuit (BLK) 38 receives the switching signal $V_{PWM}$ for generating a blanking signal $V_{BLK}$ to inhibit the reset of the D flip-flop 36 via the NAND gate 35. A second input of the NAND gate 35 is coupled to the blanking circuit 38 to receive the blanking signal $V_{BLK}$. An output of the NAND gate 35 is coupled to a reset input R of the D flip-flop 36 to reset the output Q of the D flip-flop 36 once the current-sensing signal $V_{CS}$ is higher than the voltage-feedback signal $V_{FB}$ and the reset signal RST is at a low level.

As shown in FIG. 1, the biased current-limit circuit includes an oscillator (OSC) 100, a waveform generator (AWG) 200, a sample-hold circuit (S/H) 300, and a current comparator 400. The oscillator 100 generates the pulse signal PLS. The waveform generator 200 generates a waveform signal $V_W$ in response to the switching signal $V_{PWM}$ and a second-sampling signal PASS from the sample-hold circuit 300. The sample-hold circuit 300 is used for sampling the waveform signal $V_W$ to generate a current-limit threshold $V_{LMT}$ in response to the switching signal $V_{PWM}$, the pulse signal PLS, and the current-sensing signal $V_{CS}$. The positive and the negative inputs of the current comparator 400 receive the current-limit threshold $V_{LMT}$ and the current-sensing signal $V_{CS}$ respectively. The current comparator 400 is used to compare the current-sensing signal $V_{CS}$ with the current-limit threshold $V_{LMT}$ to reset the D flip-flop 36 once the current-sensing signal $V_{CS}$ is higher than the current-limit threshold $V_{LMT}$ and the reset signal RST is at a low level. The amplitude of the current-limit threshold $V_{LMT}$ is utilized to determine a maximum on-time of the switching signal $V_{PWM}$ for limiting a maximum output power of the power converter.

Figure 2:
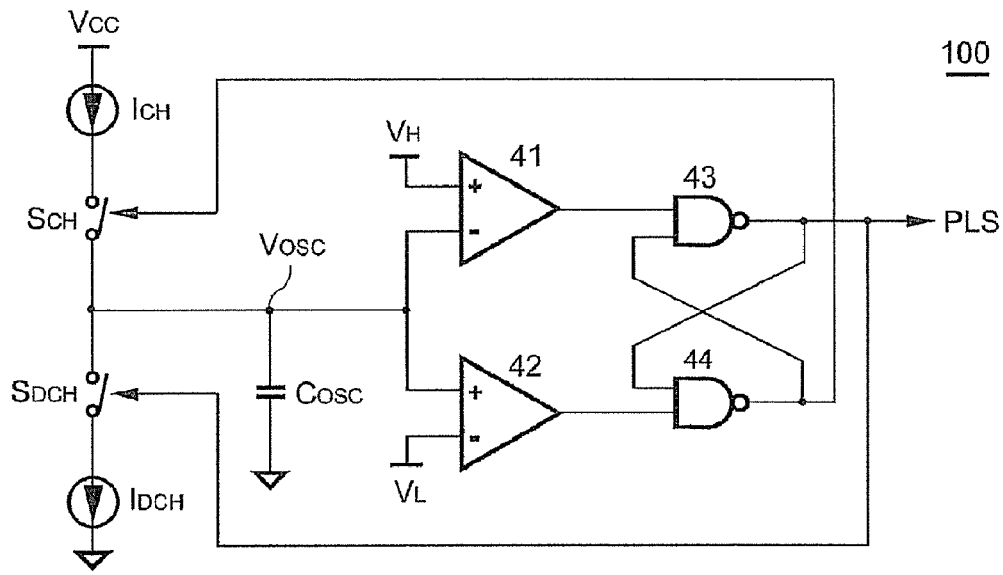
FIG. 2 is a schematic view illustrating one embodiment of the oscillator according to the present invention.

FIG. 2 is a schematic view illustrating one embodiment of the oscillator according to the present invention. The oscillator 100 includes a charging switch $S_{CH}$, a discharging switch $S_{DCH}$, a saw-tooth capacitor $C_{OSC}$, a charging current $I_{CH}$, a discharging current $I_{DCH}$, a first comparator 41, a second comparator 42, and two NAND gates 43 and 44. The charging switch $S_{CH}$ is connected between the charging current $I_{CH}$ and the saw-tooth capacitor $C_{OSC}$. The discharge switch $S_{DCH}$ is connected between the saw-tooth capacitor $C_{OSC}$ and the discharging current $I_{DCH}$. A negative terminal of the saw-tooth capacitor $C_{OSC}$ is connected to a ground. An oscillation signal $V_{OSC}$ is generated at a positive terminal of the saw-tooth capacitor $C_{OSC}$. The first comparator 41 has a positive input supplied with a threshold voltage $V_H$. A negative input of the first comparator 41 is connected to the saw-tooth capacitor $C_{OSC}$ for receiving the oscillation signal $V_{OSC}$. The second comparator 42 has a negative input supplied with a threshold voltage $V_L$. The threshold voltage $V_H$ is higher than the threshold voltage $V_L$. A positive input of the second comparator 42 is connected to the saw-tooth capacitor $C_{OSC}$ for receiving the oscillation signal $V_{OSC}$. An output of the NAND gate 43 generates the pulse signal PLS to turn on or turn off the discharging switch $S_{DCH}$. A first input of the NAND gate 43 is driven by an output of the first comparator 41. Two inputs of the NAND gate 44 are respectively connected to the output of the NAND gate 43 and an output of the second comparator 42. The output of the NAND gate 44 is connected to a second input of the NAND gate 43 and turns on or turns off the charging switch $S_{CH}$. The oscillator 100 generates the pulse signal PLS in response to the oscillation signal $V_{OSC}$ at the saw-tooth capacitor $C_{OSC}$.

As shown in FIG. 2, when the charging switch $S_{CH}$ is turned on, the charging current $I_{CH}$ charges the saw-tooth capacitor $C_{OSC}$, and the oscillation signal $V_{OSC}$ increases. At this period, the oscillation signal $V_{OSC}$ is lower than the threshold voltage $V_H$ and the discharging switch $S_{DCH}$ is turned off. The discharging current $I_{DCH}$ discharges the saw-tooth capacitor $C_{OSC}$ and the oscillation signal $V_{OSC}$ decreases when the oscillation signal $V_{OSC}$ is greater than the threshold voltage $V_H$. At this time, the charging switch $S_{CH}$ is turned off, and the discharging switch $S_{DCH}$ is turned on. The charging switch $S_{CH}$ is turned on again when the oscillation signal $V_{OSC}$ is lower than the threshold voltage $V_L$.

Figure 3:
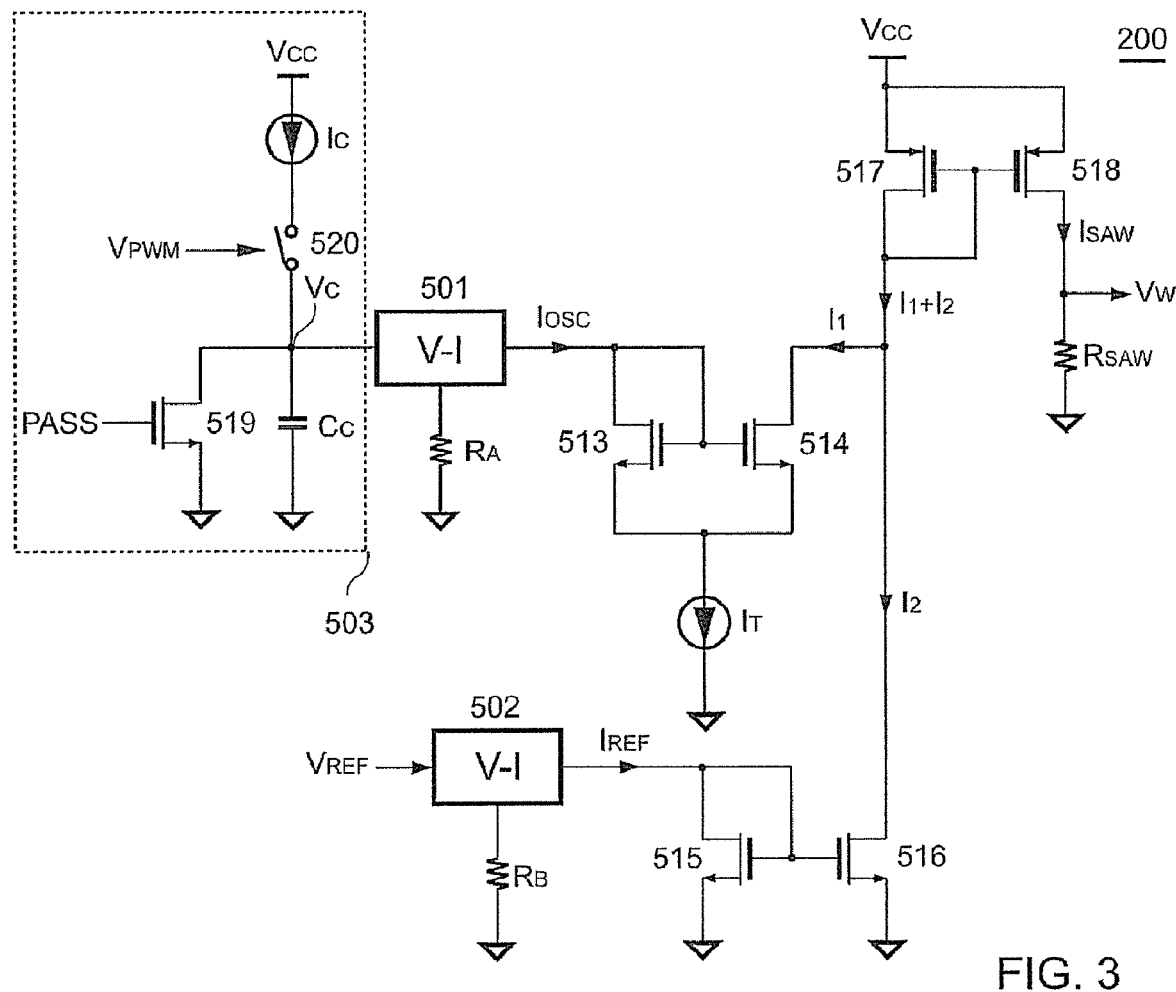
FIG. 3 is a schematic view illustrating one embodiment of the waveform generator according to the present invention.

FIG. 3 is a schematic view illustrating one embodiment of the waveform generator according to the present invention. The waveform generator 200 includes a ramp generator 503 generating a ramp signal $V_C$ in response to the switching signal $V_{PWM}$ and the second-sampling signal PASS. A discharging transistor 519, a ramp capacitor $C_C$, a charging current $I_C$ and a ramp switch 520 develop the ramp generator 503. The ramp switch 520 is connected between the charging current $I_C$ and the ramp capacitor $C_C$. The charging current $I_C$ is applied to charge the ramp capacitor $C_C$ via the ramp switch 520. The ramp switch 520 is controlled by the switching signal $V_{PWM}$. The ramp capacitor $C_C$ is connected between a drain and a source of the discharging transistor 519. The discharging transistor 519 is coupled to the ramp switch 520 and the ramp capacitor $C_C$. The source of the discharging transistor 519 and a negative terminal of the ramp capacitor $C_C$ are connected to a ground. A gate of the discharging transistor 519 is controlled by the second-sampling signal PASS to discharge the ramp capacitor $C_C$ when the second-sampling signal PASS is at a high level and the ramp switch 520 is turned off. The ramp signal $V_C$ is generated at a positive terminal of the ramp capacitor $C_C$.

A first V-to-I converter (V-I) 501 is coupled to the ramp generator 503 for generating a ramp-current signal $I_{OSC}$ via a resistor $R_A$ in response to the ramp signal $V_C$. A second V-to-I converter (V-I) 502 generates a reference-current signal $I_{REF}$ via a resistor $R_B$ in accordance with a reference signal $V_{REF}$. Transistors 513, 514, 515, 516, 517 and 518 form a current-mirror circuit. The current-mirror circuit is coupled to the first V-to-I converter 501 and the second V-to-I converter 502 for generating the waveform signal $V_W$ in accordance with the ramp-current signal $I_{OSC}$ and the reference-current signal $I_{REF}$. Furthermore, a clamped current $I_T$ is coupled to the current-mirror circuit to clamp the ramp-current signal $I_{OSC}$ within a clamped value. The waveform signal $V_W$ thus includes a first DC element, a ramp element and a second DC element. The amplitude of the second DC element is higher than the amplitude of the ramp element. The amplitude of the ramp element is higher than the amplitude of the first DC element. The amplitude of the ramp element is increased when the switching signal $V_{PWM}$ is at a high level. The amplitude of the reference signal $V_{REF}$ determines the first DC element of the waveform signal $V_W$. The amplitude of the clamped current $I_T$ determines the second DC element of the waveform signal $V_W$. The amplitude of the charging current $I_C$ and a capacitance of the ramp capacitor $C_C$ determine a slope of the ramp element of the waveform signal $V_W$. Since an output of the current-mirror circuit outputs a saw-limit current $I_{SAW}$, the waveform signal $V_W$ is generated at a saw-limit resistor $R_{SAW}$ after the saw-limit current $I_{SAW}$ flows through the saw-limit resistor $R_{SAW}$.

Figure 4:
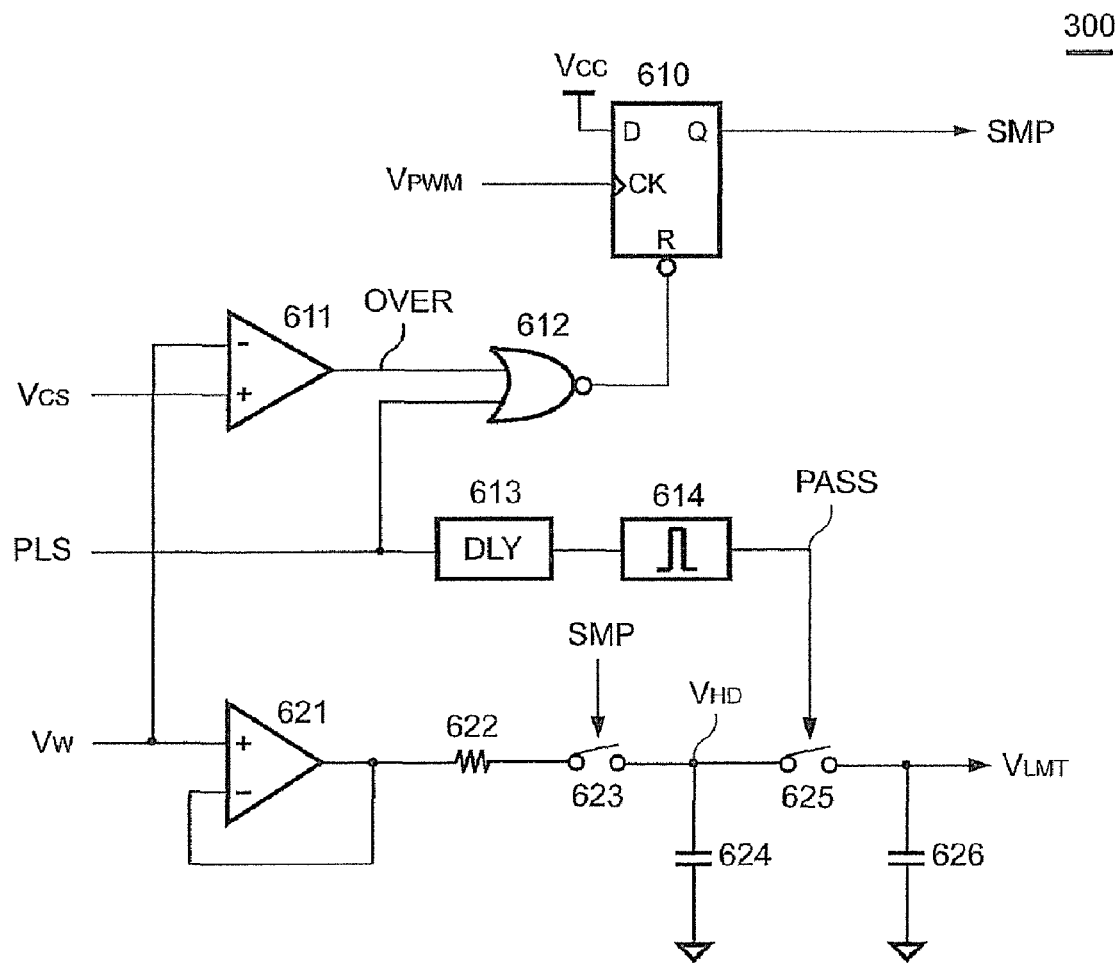
FIG. 4 is a schematic view illustrating one embodiment of the sample-hold circuit in accordance with the present invention.

FIG. 4 is a schematic view illustrating one embodiment of the sample-hold circuit in accordance with the present invention. The sample-hold circuit 300 includes a D flip-flop 610, a comparator 611, a NOR gate 612, a delay circuit 613, a one-shot pulse generator 614, a buffer 621, a resistor 622, a first switch 623, a first capacitor 624, a second switch 625, and a second capacitor 626. A clock input CK and a D input of the D flip-flop 610 receive the switching signal $V_{PWM}$ and a supply voltage $V_{CC}$, respectively. An output Q of the D flip-flop 610 generates a first-sampling signal SMP. A negative input of the comparator 611 is connected to the waveform generator 200 for receiving the waveform signal $V_W$. A positive input of the comparator 611 is connected to the current-sensing resistor $R_S$ for receiving the current-sensing signal $V_{CS}$. Two inputs of the NOR gate 612 are connected to an output of the comparator 611 and the oscillator 100 for receiving a trigger signal OVER and the pulse signal PLS, respectively. A reset input R of the D flip-flop 610 is coupled to an output of the NOR gate 612. Through the comparator 611, the trigger signal OVER is generated by comparing the waveform signal $V_W$ with the current-sensing signal $V_{CS}$. The trigger signal OVER is at a high level when the current-sensing signal $V_{CS}$ is higher than the waveform signal $V_W$. The current-sensing signal $V_{CS}$ is correlated to the switching current $I_P$ of the transformer $T_1$ (as shown in FIG. 1). Therefore, the first-sampling signal SMP is enabled in response to the switching signal $V_{PWM}$. The first-sampling signal SMP is disabled in response to the trigger signal OVER.

The delay circuit 613 is coupled to the oscillator 100 for receiving the pulse signal PLS. The one-shot pulse generator 614 is coupled to the delay circuit 613 for generating the second-sampling signal PASS. The second-sampling signal PASS is thus generated by the pulse signal PLS via the delay circuit 613 and the one-shot pulse generator 614. A positive input of the buffer 621 receives the waveform signal $V_W$. A negative input of the buffer 621 is connected to an output of the buffer 621. An input of the first switch 623 is coupled to the output of the buffer 621 via the resistor 622. An output of the first switch 623 is connected to a positive terminal of the first capacitor 624. A negative terminal of the first capacitor 624 is connected to the ground. The first switch 623 is controlled by the first-sampling signal SMP to sample the waveform signal $V_W$ for generating a hold signal $V_{HD}$. The hold signal $V_{HD}$ is stored at the positive terminal of the first capacitor 624. An input of the second switch 625 is coupled to the first capacitor 624 for receiving the hold signal $V_{HD}$. An output of the second switch 625 is connected to a positive terminal of the second capacitor 626. A negative terminal of the second capacitor 626 is connected to the ground. The second switch 625 is controlled by the second-sampling signal PASS to sample the hold signal $V_{HD}$ for generating the current-limit threshold $V_{LMT}$. In other words, the second capacitor 626 is coupled to the first capacitor 624 via the second switch 625 to sample the hold signal $V_{HD}$ in response to the second-sampling signal PASS for generating the current-limit threshold $V_{LMT}$. The signal sampled from the first capacitor 624 to the second capacitor 626 achieves a low-pass filtering operation.

Figure 5:
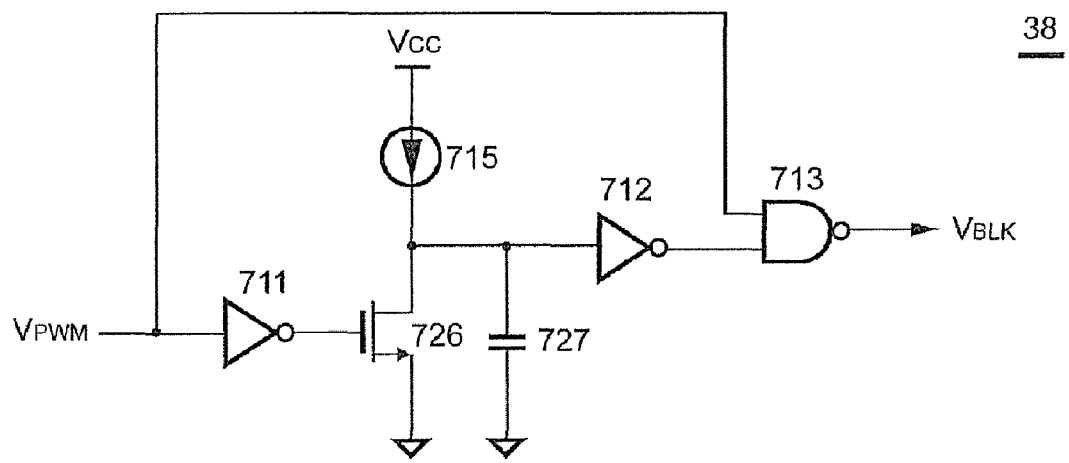
FIG. 5 is a schematic view illustrating one embodiment of the blanking circuit in accordance with the present invention.

FIG. 5 is a schematic view illustrating one embodiment of the blanking circuit in accordance with the present invention. The blanking circuit 38 includes a current source 715, a transistor 726, two inverters 711 and 712, a capacitor 727, and a NAND gate 713. The switching signal $V_{PWM}$ is supplied to an input of the inverter 711 and a first input of the NAND gate 713. The current source 715 is applied to charge the capacitor 727. The capacitor 727 is connected between a drain of the transistor 726 and a ground. The source of the transistor 726 is connected to the ground. An output of the inverter 711 turns on or turns off the transistor 726. An input of the inverter 712 is coupled to the capacitor 727. An output of the inverter 712 is connected to a second input of the NAND gate 713. An output of the NAND gate 713 generates a blanking signal $V_{BLK}$. The amplitude of the current source 715 and the capacitance of the capacitor 727 determine the pulse width of the blanking signal $V_{BLK}$. When the switching signal $V_{PWM}$ is enabled, the blanking circuit 38 generates the blanking signal $V_{BLK}$ to inhibit the reset of the D flip-flop 36 (as shown in FIG. 1).

Figure 6:
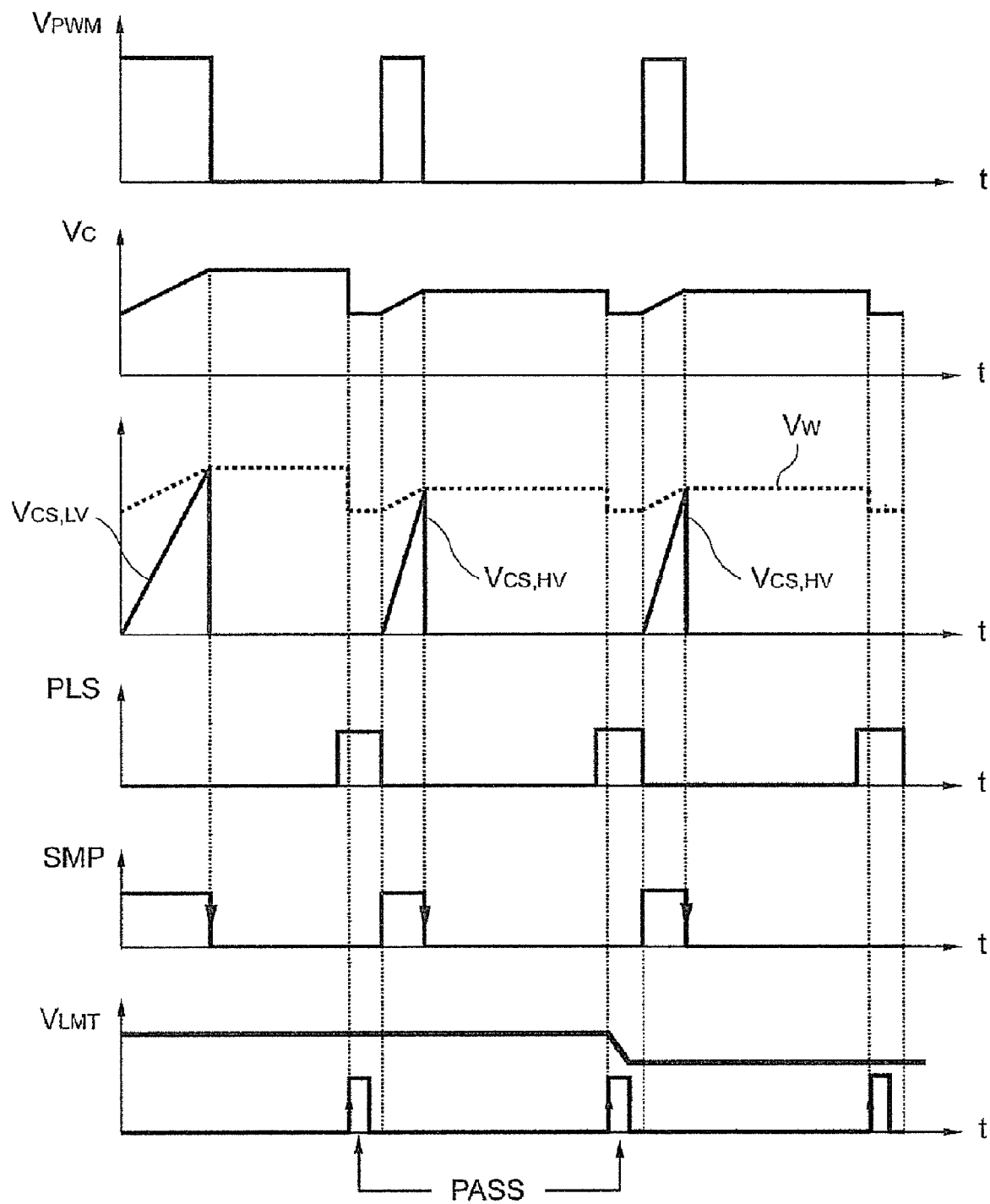
FIG. 6 shows the waveforms of the switching signal, the ramp signal, the waveform signal, the current-sensing signal, the pulse signal, the first-sampling signal, the second-sampling signal, and the current-limit threshold according to the present invention.

FIG. 6 shows the waveforms of the switching signal, the ramp signal, the waveform signal, the current-sensing signal, the pulse signal, the first-sampling signal, the second-sampling signal and the current-limit threshold according to the present invention. The ramp signal $V_C$ at the ramp capacitor $C_C$ is generated by the ramp generator 503 in response to the switching signal $V_{PWM}$ and the second-sampling signal PASS. The second-sampling signal PASS is generated when the switching signal $V_{PWM}$ is at a low level and the pulse signal PLS is at a high level. As shown in FIG. 1, the pulse signal PLS generated by the oscillator 100 is coupled to provide a dead time to the switching signal $V_{PWM}$ through the first inverter 31 and the second AND gate 37. The first-sampling signal SMP is enabled in response to the switching signal $V_{PWM}$. The first-sampling signal SMP is disabled when the current-sensing signal $V_{CS}$ is higher than the waveform signal $V_W$. As shown in FIG. 6, the amplitude of the input voltage $V_{IN}$ affects the pulse width of the switching signal $V_{PWM}$ and the current-sensing signal $V_{CS}$. The pulse width of the current-sensing signal $V_{CS,HV}$ during a high-line input voltage is shorter than the pulse width of the current-sensing signal $V_{CS,LV}$ during a low-line input voltage. The current-limit threshold $V_{LMT}$ is a constant when the switching signal $V_{PWM}$ is at a high level. The current-limit threshold $V_{LMT}$ can only be changed when the switching signal $V_{PWM}$ is at a low level. When the input voltage $V_{IN}$ is changed, the amplitude of the current-limit threshold $V_{LMT}$ is modulated in accordance with the second-sampling signal PASS.

Referring to FIG. 1 and FIG. 6, the sample-hold circuit 300 is used to sample the waveform signal $V_W$ and the hold signal $V_{HD}$ for generating the current-limit threshold $V_{LMT}$ in response to the first-sampling signal SMP and the second-sampling signal PASS. By comparing the current-sensing signal $V_{CS}$ with the current-limit threshold $V_{LMT}$, the switching signal $V_{PWM}$ is turned off once the current-sensing signal $V_{CS}$ is higher than the current-limit threshold $V_{LMT}$. The amplitude of the current-limit threshold $V_{LMT}$ is used to restrict the pulse width of the switching signal $V_{PWM}$ and further determine the maximum on-time of the switching signal $V_{PWM}$ for limiting the maximum output power of the power converter. Therefore, the biased current-limit circuit can compensate the difference caused by the variation of the input voltage, and an identical maximum output power for the low-line and high-line input voltages can be achieved.

The foregoing descriptions of the detailed embodiments are only illustrated to disclose the features and functions of the present invention and not restrictive to the scope of the present invention. It should be understood to those in the art that all modifications and variations according to the spirit and principle in the disclosure of the present invention should fall within the scope of the appended claims.

What is claimed is:

1. A method of a biased current limit for limiting a maximum output power of a power converter, comprising:
    generating a pulse signal;
    generating a waveform signal in response to a switching signal and a second-sampling signal, wherein the switching signal is utilized to switch a transformer of the power converter, and the second-sampling signal is correlated to the pulse signal;
    comparing the waveform signal with a current-sensing signal to generate a first-sampling signal, wherein the current-sensing signal is correlated to a switching current of the transformer;
    sampling the waveform signal to generate a hold signal in response to the first-sampling signal;
    sampling the hold signal to generate a current-limit threshold in response to the second-sampling signal; and
    comparing the current-sensing signal with the current-limit threshold to limit a maximum on-time of the switching signal.

2. The method as claimed in claim 1, wherein the current-limit threshold is a constant when the switching signal is at a high level.

3. The method as claimed in claim 1, wherein the current-limit threshold is only changed when the switching signal is at a low level.

4. The method as claimed in claim 1, the waveform signal comprising:
    a first DC element;
    a ramp element, wherein the amplitude of the ramp element is higher than the amplitude of the first DC element, and the amplitude of the ramp element increases when the switching signal is at a high level; and
    a second DC element, wherein the amplitude of the second DC element is higher than the amplitude of the ramp element.

5. The biased current-limit circuit as claimed in claim 1, wherein the first-sampling signal is enabled in response to the switching signal, the first-sampling signal is disabled in response to a trigger signal, and the trigger signal is generated when the current-sensing signal is higher than the waveform signal.

6. A biased current-limit circuit for limiting a maximum output power of a power converter, comprising:

an oscillator, generating a pulse signal;

a waveform generator, generating a waveform signal in response to a switching signal and a second-sampling signal, wherein the switching signal is utilized to switch a transformer of the power converter, and the second-sampling signal is correlated to the pulse signal;

a sample-hold circuit, sampling the waveform signal to generate a hold signal in response to a first-sampling signal, the sample-hold circuit further sampling the hold signal to generate a current-limit threshold in response to the second-sampling signal, wherein the first-sampling signal is generated by comparing the waveform signal with a current-sensing signal, and the current-sensing signal is correlated to a switching current of the transformer; and a current comparator, comparing the current-sensing signal with the current-limit threshold to limit a maximum on-time of the switching signal.

7. The biased current-limit circuit as claimed in claim 6, wherein the current-limit threshold is a constant when the switching signal is at a high level.

8. The biased current-limit circuit as claimed in claim 6, wherein the current-limit threshold is only changed when the switching signal is at a low level.

9. The biased current-limit circuit as claimed in claim 6, the waveform signal comprising:

a first DC element;

a ramp element, wherein the amplitude of the ramp element is higher than the amplitude of the first DC element, and the amplitude of the ramp element increases when the switching signal is at a high level; and a second DC element, wherein the amplitude of the second DC element is higher than the amplitude of the ramp element.

10. The biased current-limit circuit as claimed in claim 6, the waveform generator comprising:

a ramp generator, generating a ramp signal in response to the switching signal and the second-sampling signal;

a first V-to-I converter, coupled to the ramp generator to generate a ramp-current signal in response to the ramp signal;

a second V-to-I converter, generating a reference-current signal in accordance with a reference signal;

a current-mirror circuit, coupled to the first V-to-I converter and the second V-to-I converter for generating the waveform signal in accordance with the ramp-current signal and the reference-current signal; and a clamped current, coupled to the current-mirror circuit to clamp the ramp-current signal within a clamped value, wherein the amplitude of the reference signal determines a first DC element of the waveform signal, and the amplitude of the clamped current determines a second DC element of the waveform signal.

11. The biased current-limit circuit as claimed in claim 10, the ramp generator comprising:

a ramp switch, coupled to a charging current and controlled by the switching signal;

a ramp capacitor, coupled to the ramp switch and the first V-to-I converter for generating the ramp signal in response to the switching signal, wherein the ramp capacitor is charged by the charging current, and the amplitude of the charging current and the capacitance of the ramp capacitor determine a slope of a ramp element of the waveform signal; and a discharging transistor, coupled to the ramp switch, the ramp capacitor and the first V-to-I converter for discharging the ramp capacitor when the second-sampling signal is at a high level and the ramp switch is turned off.

12. The biased current-limit circuit as claimed in claim 6, wherein the first-sampling signal is enabled in response to the switching signal, the first-sampling signal is disabled in response to a trigger signal, and the trigger signal is generated when the current-sensing signal is higher than the waveform signal.

* * * * *